(12) United States Patent
Fukuda

(10) Patent No.: US 11,057,208 B2
(45) Date of Patent: Jul. 6, 2021

(54) MANAGEMENT SYSTEM, MANAGEMENT DEVICE, MANAGEMENT METHOD, PROGRAM, AND NON-TRANSITORY COMPUTER-READABLE INFORMATION RECORDING MEDIUM

(71) Applicant: Rakuten, Inc., Tokyo (JP)

(72) Inventor: Yuki Fukuda, Tokyo (JP)

(73) Assignee: Rakuten, Inc., Tokyo (JP)

( * ) Notice: Subject to any disclaimer, the term of this patent is extended or adjusted under 35 U.S.C. 154(b) by 269 days.

(21) Appl. No.: 16/327,140

(22) PCT Filed: Aug. 22, 2016

(86) PCT No.: PCT/JP2016/074335
§ 371 (c)(1),
(2) Date: Jun. 17, 2019

(87) PCT Pub. No.: WO2018/037439
PCT Pub. Date: Mar. 1, 2018

(65) Prior Publication Data
US 2019/0334714 A1 Oct. 31, 2019

(51) Int. Cl.
*H04L 9/08* (2006.01)
*G06F 21/62* (2013.01)

(52) U.S. Cl.
CPC ........ *H04L 9/0891* (2013.01); *G06F 21/6218* (2013.01)

(58) Field of Classification Search
CPC ... H04L 9/0894; H04L 9/0891; H04L 9/0897; H04L 9/0866; H04L 9/085; H04L 9/0819;
(Continued)

(56) References Cited

U.S. PATENT DOCUMENTS 5,805,705 A * 9/1998 Gray .................. H04L 9/12
380/260
6,892,210 B1 * 5/2005 Erickson ................ G06F 16/27
(Continued)

FOREIGN PATENT DOCUMENTS

JP 2007-004645 A 1/2007

OTHER PUBLICATIONS

Stephanie Riché, et al., Client-Side Profile Storage: a means to put the user in control, HP Laboratories Grenoble (Year: 2001).*
(Continued)

*Primary Examiner* — Kambiz Zand
*Assistant Examiner* — Mahabub S Ahmed
(74) *Attorney, Agent, or Firm* — Sughrue Mion, PLLC

(57) ABSTRACT

A management system includes a first management device (110) and a second management device (120). The first management device (110) includes a first updater (111) that updates first secret information that is managed in association with a first identifier; a first extractor (112) that extracts a first old fragment and a first new fragment, the first old fragment being included in the first secret information prior to an update but not included in the first secret information subsequent to the update, the first new fragment being not included in the first secret information prior to the update but included in the first secret information subsequent to the update; and a first sender (113) that sends a first notice that specifies the first identifier, the first old fragment, and the first new fragment to the second management device (120). The second management device (120) includes a second receiver (124) that receives the first notice; and a second warning issuer (125) that warns a user using the first identifier to correct second secret information managed in association with the first identifier when the second secret information includes the first old fragment specified in the
(Continued)

first notice but does not include the first new fragment specified in the first notice.

9 Claims, 8 Drawing Sheets

(58) Field of Classification Search
CPC .. H04L 9/0838; H04L 9/0847; G06F 21/6218
USPC .......................................................... 380/42
See application file for complete search history.

(56) References Cited

U.S. PATENT DOCUMENTS

| | | | | |
|---|---|---|---|---|
| 8,620,866 B2* | 12/2013 | Fitzpatrick | ............... | G06F 16/27 707/636 |
| 8,732,344 B2* | 5/2014 | Miyazawa | ............. | H04L 9/3263 710/8 |
| 9,203,616 B1* | 12/2015 | Brown | ................. | H04L 9/3273 |
| 9,558,341 B1* | 1/2017 | Allababidi | ............... | G06F 21/45 |
| 10,021,120 B1* | 7/2018 | Salour | .................... | G06F 21/566 |
| 10,148,430 B1* | 12/2018 | Roth | ...................... | H04L 9/0891 |
| 10,636,103 B2* | 4/2020 | Molinsky | ............... | G06Q 50/18 |
| 2002/0110245 A1* | 8/2002 | Gruia | ..................... | H04L 9/0891 380/278 |
| 2002/0164035 A1* | 11/2002 | Yokota | .................... | H04L 9/083 380/278 |
| 2005/0044356 A1* | 2/2005 | Srivastava | .......... | H04L 63/0281 713/163 |
| 2005/0097225 A1* | 5/2005 | Glatt | ....................... | H04L 67/34 709/248 |
| 2005/0216754 A1* | 9/2005 | Ehud | .................... | G06F 21/6209 713/193 |
| 2006/0248346 A1* | 11/2006 | Shiomi | ................. | H04L 9/0847 713/184 |
| 2006/0282674 A1* | 12/2006 | Saito | ..................... | G06T 1/0071 713/176 |
| 2007/0198413 A1* | 8/2007 | Nagao | .................. | H04L 9/0822 705/50 |
| 2008/0052514 A1* | 2/2008 | Nakae | ................. | H04L 61/1582 713/168 |
| 2008/0320172 A1* | 12/2008 | Kruglikov | ............. | G06F 16/275 709/248 |
| 2009/0210453 A1* | 8/2009 | Vetter | ................... | G06F 16/273 |
| 2010/0208898 A1* | 8/2010 | Acar | ...................... | H04L 9/0891 380/280 |
| 2010/0224678 A1* | 9/2010 | Duk | ........................ | G06Q 10/10 235/375 |
| 2011/0164752 A1* | 7/2011 | Wainner | ............. | H04L 12/1818 380/277 |
| 2011/0173322 A1* | 7/2011 | Urbanek | ............... | H04L 63/104 709/224 |
| 2013/0247165 A1* | 9/2013 | Pal | ........................ | H04L 63/102 726/10 |
| 2014/0281540 A1* | 9/2014 | Brouwer | ................. | G06F 16/27 713/169 |
| 2014/0359290 A1* | 12/2014 | Mccusker | ............... | H04L 9/006 713/168 |
| 2016/0119312 A1* | 4/2016 | Armstrong | ........... | H04L 9/3228 713/171 |
| 2016/0149908 A1* | 5/2016 | Unagami | .............. | H04L 63/061 713/170 |
| 2017/0078283 A1* | 3/2017 | Unagami | .............. | H04L 9/0833 |
| 2017/0222802 A1* | 8/2017 | Rubin | ....................... | H04L 9/14 |
| 2017/0366527 A1* | 12/2017 | Oxford | ................. | H04L 63/062 |
| 2017/0366581 A1* | 12/2017 | Ylonen | ................. | H04L 9/3263 |
| 2018/0150642 A1* | 5/2018 | Kiribuchi | ................ | G06F 16/21 |
| 2019/0109708 A1* | 4/2019 | Roth | ..................... | H04L 9/0819 |
| 2020/0258177 A1* | 8/2020 | Molinsky | ............... | G06Q 40/00 |

OTHER PUBLICATIONS

Mika Yrjölä, The synchronization of personal information between mobile devices and online services by using SyncML, Master's thesis. Lappeenranta University of Technology. (Year: 2004).*

Han, et al., MetaSync: File Synchronization Across Multiple Untrusted Storage Services, 2015 USENIX Annual Technical Conference (USENIC ATC '15). Jul. 8-10, 2015 • Santa Clara, CA, USA (Year: 2015).*

International Search Report for PCT/JP2016/074335, dated Nov. 8, 2016.

* cited by examiner

FIG. 5

SECRET INFORMATION TABLE (FIRST MANAGEMENT DEVICE) 400a

| IDENTIFIER (400a1) | SECRET INFORMATION (HOME ADDRESS) (400a2 / 400a3) | |
| --- | --- | --- |
| | PRIOR TO UPDATE | SUBSEQUENT TO UPDATE |
| xxx@xxx.com | 東京都品川区東品川9-8-7 | 東京都世田谷区玉川西6-5-4 |
| yyy@yyy.com | 千葉県柏市明原10-11-12 | - |
| ⋮ | ⋮ | ⋮ |

FIG. 6

SECRET INFORMATION TABLE (SECOND MANAGEMENT DEVICE) 400b

| IDENTIFIER | SECRET INFORMATION (HOME ADDRESS) | |
|---|---|---|
| | PRIOR TO UPDATE | SUBSEQUENT TO UPDATE |
| xxx@xxx.com | 東京都品川区東品川9-8-7 | - |
| yyy@yyy.com | 千葉県柏市明原10-11-12 | 福岡県福岡市中央区6-7-8 |
| : | : | : |

Sent to: user name xxx@xxx.com

Your personal information previously including "東" has been updated on another management device and the updated information now includes "玉".

Do you want to update your personal information on this management device?

Yes   No

MANAGEMENT SYSTEM, MANAGEMENT DEVICE, MANAGEMENT METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2016/074335, filed Aug. 22, 2016.

TECHNICAL FIELD

The present disclosure relates to a management system, a management device, a management method, a program, and a non-transitory computer-readable information recording medium, and more particularly, to management of personal information.

BACKGROUND ART

A single piece of identification information pertaining to a user may sometimes be shared by a plurality of group companies. However, in view of protection of personal information, the user may be required to separately register the personal information associated with such identification information with individual companies even if the individual companies are members of a group. In such cases, the user may possibly change the personal information registered with a company while forgetting to change the personal information registered with another company.

Regarding personal information managed by a plurality of terminals, techniques for enabling centralized management are known. For example, Patent Literature 1 discloses a technique by which a personal information exploration program resides in a plurality of client terminals within a company and, upon detection of any addition or editing in a personal information file after the program is executed, the detection result is sent to a personal information management server.

CITATION LIST

Patent Literature

Patent Literature 1: Unexamined Japanese Patent Application Kokai Publication No. 2007-4645

SUMMARY OF INVENTION

Technical Problem

The technique disclosed in Patent Literature 1, however, deals with personal information stored in terminals within a single company, and it is still difficult indeed, in view of protection of personal information, to centrally manage or share personal information possessed by group companies. Under such circumstances, there have been problems of higher cost caused by the necessity to make an inquiry to a user who has changed the personal information registered with one group company while failing to change the personal information registered with another group company, although these group companies possess the personal information regarding the same user.

The present disclosure is intended to solve the aforementioned problems, and an objective of the present disclosure is to provide a management system, a management device, a management method, a program, and a non-transitory computer-readable information recording medium that are suitable for notifying of a change made to personal information without sharing the personal information itself.

Solution to Problem

A management system according to a first aspect of the present disclosure is a management system including a first management device and a second management device, the first management device managing a first identifier and first secret information associated with each other, the second management device managing the first identifier and second secret information associated with each other,
wherein the first management device includes:
a first updater that updates the first secret information;
a first extractor that extracts a first old fragment and a first new fragment, the first old fragment being included in the first secret information prior to an update but not included in the first secret information subsequent to the update, the first new fragment being not included in the first secret information prior to the update but included in the first secret information subsequent to the update; and
a first sender that sends a first notice that specifies the first identifier, the first old fragment, and the first new fragment to the second management device, and
wherein the second management device includes:
a second receiver that receives the first notice from the first management device; and
a second warning issuer that warns a user using the first identifier to correct the second secret information when the second secret information includes the first old fragment specified in the first notice but does not include the first new fragment specified in the first notice.

In the management system according to the foregoing aspect,
the first extractor searches a predetermined database for fragments that are included in the first secret information prior to the update but are not included in the first secret information subsequent to the update, and identifies a fragment having at least a predetermined number of search results as the first old fragment, and the first extractor searches the predetermined database for fragments that are not included in the first secret information prior to the update but are included in the first secret information subsequent to the update, and identifies a fragment having at least the predetermined number of search results as the first new fragment.

In the management system according to the foregoing aspect,
the first extractor extracts a plurality of the first old fragments and a plurality of the first new fragments from the first secret information,
the first sender sends the first notice that specifies the first identifier, the plurality of the first old fragments, and the plurality of the first new fragments to the second management device, and
if the second secret information includes any of the plurality of the first old fragments and does not include all of the plurality of the first new fragments, the second warning issuer warns the user using the first identifier to correct the second secret information.

In the management system according to the foregoing aspect, the first sender sends the first notice in which the plurality of the first old fragments is arranged in random order and the plurality of the first new fragments is arranged in random order to the second management device.

In the management system according to the foregoing aspect, the first management device manages third secret information in association with a second identifier, the second management device manages fourth secret information in association with the second identifier, the second management device further includes:
a second updater that updates the fourth secret information;
a second extractor that extracts a second old fragment and a second new fragment, the second old fragment being included in the fourth secret information prior to an update but not included in the fourth secret information subsequent to the update, the second new fragment being not included in the fourth secret information prior to the update but included in the fourth secret information subsequent to the update; and
a second sender that sends a second notice that specifies the second identifier, the second new fragment, and the second old fragment to the first management device, the first management device further includes:
a first receiver that receives the second notice from the second management device; and
a first warning issuer that warns a user using the second identifier to correct the third secret information when the third secret information includes the second old fragment specified in the second notice but does not include the second new fragment specified in the second notice, the first updater further updates the third secret information, the first extractor further extracts a third old fragment and a third new fragment, the third old fragment being included in the third secret information prior to an update but not included in the third secret information subsequent to the update, the third new fragment being not included in the third secret information prior to the update but included in the third secret information subsequent to the update, the first sender further sends a third notice that specifies the second identifier, the third old fragment, and the third new fragment to the second management device, and in the first management device,
the first sender refrains from sending the third notice to the second management device if the update of the third secret information performed by the first updater is attributable to the second notice and the second new fragment matches the third new fragment.

In the management system according to the foregoing aspect, the second warning issuer gives a warning by presenting the first old fragment and the first new fragment to the user using the first identifier.

A management device according to a second aspect of the present disclosure is a management device that manages an identifier and secret information associated with each other, the management device including:
an updater that updates the secret information;
an extractor that extracts an old fragment and a new fragment, the old fragment being included in the secret information prior to an update but not included in the secret information subsequent to the update, the new fragment being not included in the secret information prior the update but included in the secret information subsequent to the update;
a sender that sends a notice that specifies the identifier, the old fragment, and the new fragment to another management device;
a receiver that receives another notice from the another management device; and
a warning issuer that warns, when other secret information managed in association with another identifier specified in the another notice includes another old fragment specified in the another notice but does not include another new fragment specified in the another notice, a user using the another identifier to correct the other secret information.

A management method according to a third aspect of the present disclosure is a management method executed by a management system that includes a first management device and a second management device, the first management device managing a first identifier and first secret information associated with each other, the second management device managing the first identifier and second secret information associated with each other, the management method including:
a first updating step of updating the first secret information, the first updating step being performed by the first management device;
a first extracting step of extracting a first old fragment and a first new fragment, the first old fragment being included in the first secret information prior to an update but not included in the first secret information subsequent to the update, the first new fragment being not included in the first secret information prior to the update but included in the first secret information subsequent to the update, the first extracting step being performed by the first management device;
a first sending step of sending a first notice that specifies the first identifier, the first old fragment, and the first new fragment to the second management device, the first sending step being performed by the first management device;
a second receiving step of receiving the first notice from the first management device, the second receiving step being performed by the second management device; and
a second warning step of warning a user using the first identifier to correct the second secret information when the second secret information includes the first old fragment specified in the first notice but does not include the first new fragment specified in the first notice, the second warning step being performed by the second management device.

A program according to a fourth aspect of the present disclosure is a program causing a computer to function as a management device that manages an identifier and secret information associated with each other, the program causing the computer to function as:
an updater that updates the secret information,
an extractor that extracts an old fragment and a new fragment, the old fragment being included in the secret information prior to an update but not included in the secret information subsequent to the update, the new fragment being not included in the secret information prior to the update but included in the secret information subsequent to the update;
a sender that sends a notice that specifies the identifier, the old fragment, and the new fragment to another management device;
a receiver that receives another notice from the another management device; and
a warning issuer that warns, when other secret information managed in association with another identifier specified in the another notice includes another old fragment specified in the another notice but does not include another new fragment specified in the another notice, a user using the another identifier to correct the other secret information.

A non-transitory computer-readable information recording medium according to a fifth aspect of the present disclosure records a program causing a computer to function as a management device that manages an identifier and secret information associated with each other, the program causing the computer to function as:

an updater that updates the secret information;

an extractor that extracts an old fragment and a new fragment, the old fragment being included in the secret information prior to an update but not included in the secret information subsequent to the update, the new fragment being not included in the secret information prior to the update but included in the secret information subsequent to the update;

a sender that sends a notice that specifies the identifier, the old fragment, and the new fragment to another management device;

a receiver that receives another notice from the another management device; and a warning issuer that warns, when other secret information managed in association with another identifier specified in the another notice includes another old fragment specified in the another notice but does not include another new fragment specified in the another notice, a user using the another identifier to correct the other secret information.

The aforementioned non-transitory computer-readable information recording medium may be distributed or sold independently of computers. The non-transitory information recording medium as used herein refers to a tangible information recording medium. Examples of the non-transitory information recording medium include a compact disk, a flexible disk, a hard disk, a magneto-optical disk, a digital video disk, a magnetic tape, and a semiconductor memory. A transitory information recording medium refers to a transmission medium (a propagated signal) itself. Examples of the transitory information recording medium include an electronic signal, an optical signal, and an electromagnetic wave. A temporary storage area refers to an area for temporarily storing data and programs, such as a random access memory (RAM) and other volatile memories.

Advantageous Effects of Invention

The present disclosure makes it possible to provide a management system, a management device, a management method, a program, and a non-transitory computer-readable information recording medium that are suitable for notifying of a change made to personal information without sharing the personal information itself.

BRIEF DESCRIPTION OF DRAWINGS

FIG. 5 is an explanatory diagram illustrating a secret information table (first management device);

FIG. 6 is an explanatory diagram illustrating a secret information table (second management device);

FIG. 7 is an explanatory diagram illustrating a warning page presented to a user.

DESCRIPTION OF EMBODIMENTS

1. General Configuration

Figure 1:
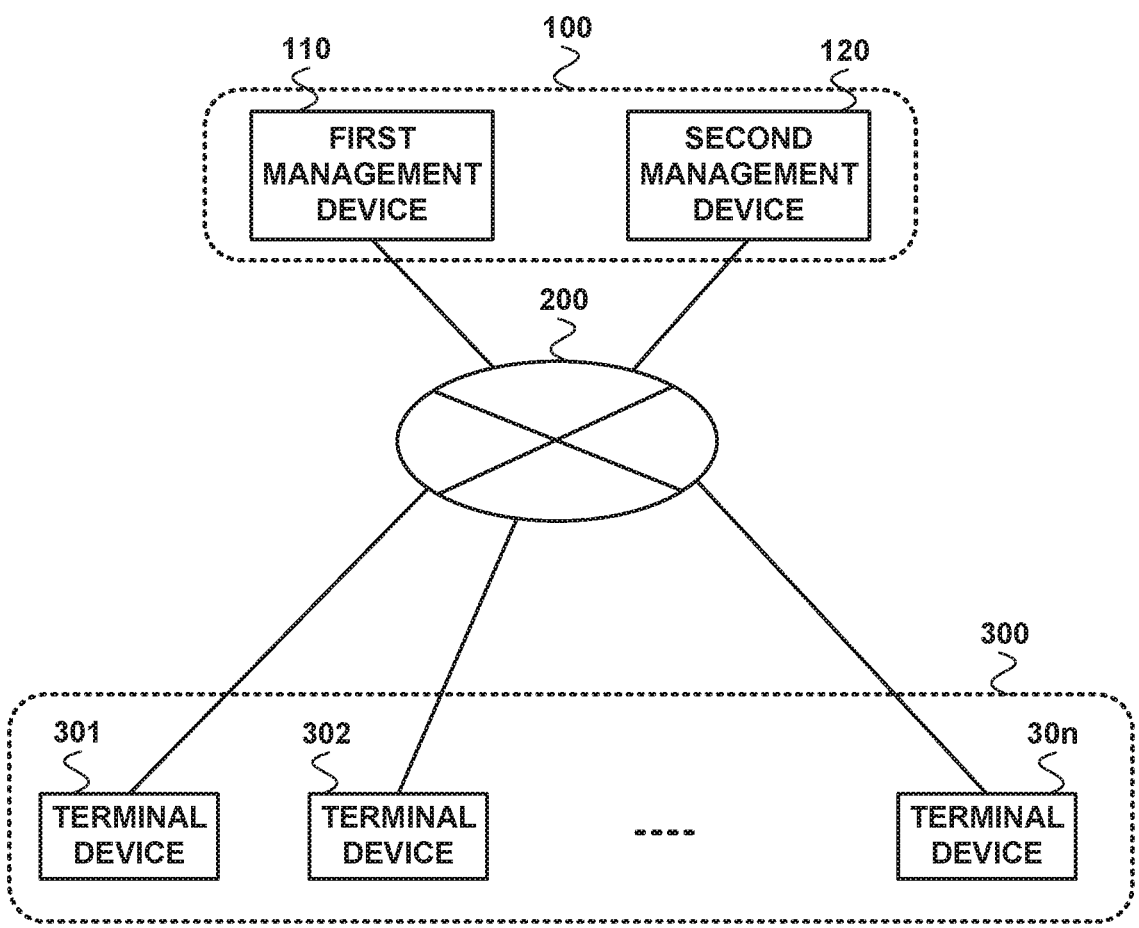
FIG. 1 illustrates a relationship between a management system and terminal devices according to an embodiment of the present disclosure.

As illustrated in FIG. 1, a management system 100 according to an embodiment of the present disclosure includes a first management device 110 and a second management device 120. The first management device 110, the second management device 120, and terminal devices 301, 302, . . . 30$n$ (where n is a natural number equal to or greater than 1. These terminal devices are hereinafter collectively called a "terminal device 300") are connected to the Internet 200.

The first management device 110 and the second management device 120 each manage personal information regarding users.

The terminal device 300 is a device operated by a user whose user account is registered with the first management device 110 and the second management device 120.

Note that the present embodiment illustrates an example in which the management system 100 includes two management devices, but the number of management devices is not limited to 2 and may be any number equal to or greater than 2.

Figure 2:
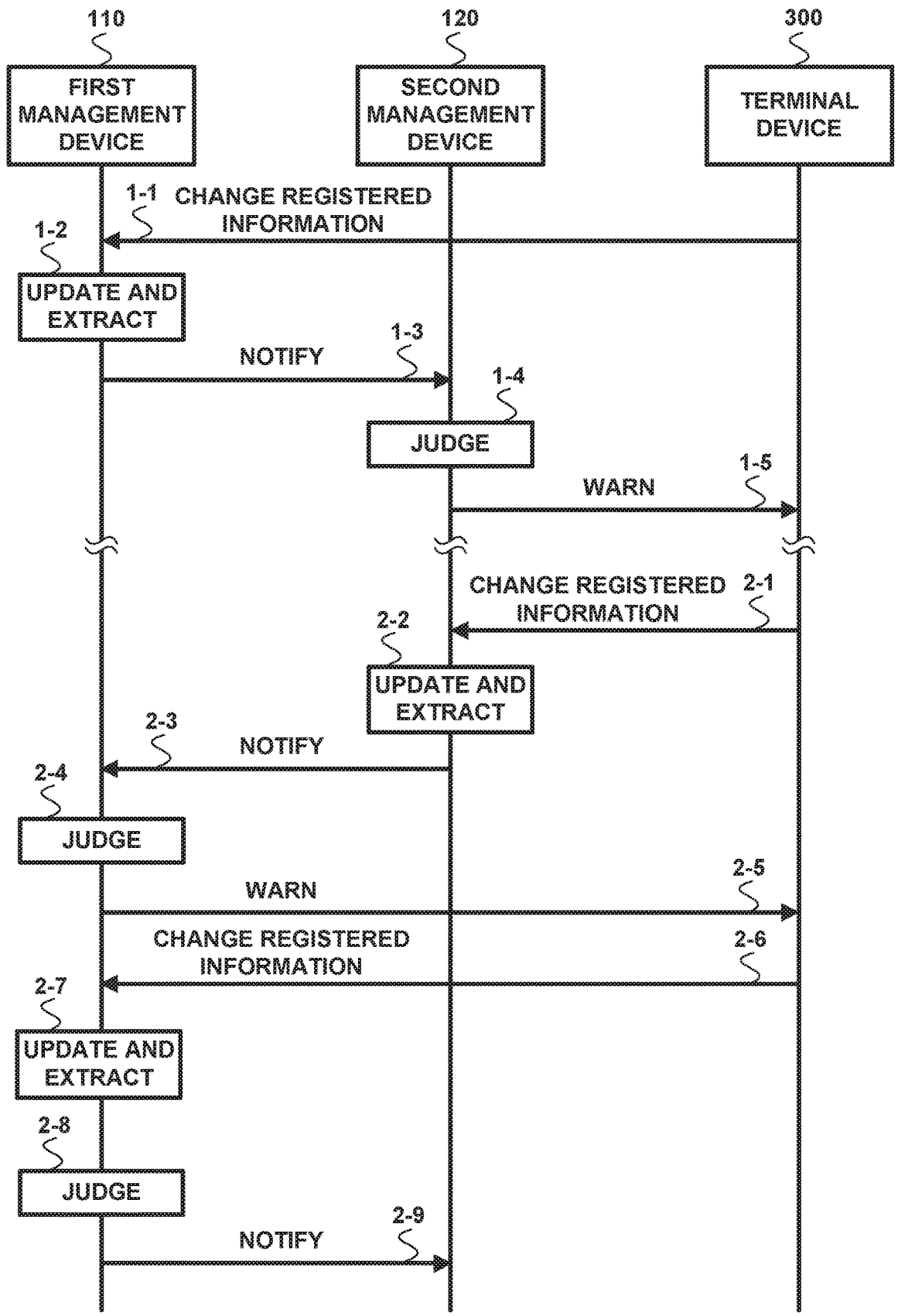
FIG. 2 is an explanatory diagram illustrating an example of communications among a first management device, a second management device, and a terminal device, the first and second management devices being included in the management system.

FIG. 2 illustrates an example of communications among the first management device 110, the second management device 120, which are included in the management system 100, and the terminal device 300.

The terminal device 300 accesses the first management device 110 to change the registered information (1-1).

The first management device 110 updates the registered information on the basis of the information received from the terminal device 300, and extracts a fragment from the registered information prior to the update (hereinafter called an "old fragment") and a fragment from the registered information subsequent to the update (hereinafter called a "new fragment") (1-2).

The first management device 110 gives the second management device 120 a notice of the identifier of the user whose registered information has been updated and of the old fragment and new fragment that have been extracted (1-3).

The second management device 120 receives the notice from the first management device 110, and then determines whether the registered information that is managed by the second management device 120 and is associated with the received identifier satisfies the condition that the registered information includes the received old fragment but does not include the received new fragment (1-4).

When it is determined that the registered information associated with the received identifier includes the received old fragment but does not include the received new fragment, the second management device 120 warns the terminal device 300 operated by the user of the identifier to update the registered information on the second management device 120 (1-5).

The foregoing communications also take place when the terminal device 300 changes the information registered to the second management device 120.

The terminal device 300 accesses the second management device 120 to change the registered information (2-1).

On the basis of the information received from the terminal device 300, the second management device 120 updates the registered information and extracts an old fragment and a new fragment (2-2).

The second management device 120 gives the first management device 110 a notice of the identifier of the user whose registered information has been updated and of the old fragment and new fragment that have been extracted (2-3).

The first management device 110 receives the notice from the second management device 120, and then determines whether the registered information that is managed by the first management device 110 and is associated with the received identifier satisfies the condition that the registered information includes the received old fragment but does not include the received new fragment (2-4).

When it is determined that the registered information associated with the received identifier includes the received old fragment but does not include the received new fragment, the first management device 110 warns the terminal device 300 operated by the user of the identifier to update the registered information on the first management device 110 (2-5).

Upon receipt of the warning, the terminal device 300 accesses the first management device 110 to change the registered information (2-6).

On the basis of the information received from the terminal device 300, the first management device 110 updates the registered information and extracts an old fragment and a new fragment (2-7).

The first management device 110 determines whether the operation of updating the registered information as accepted from the terminal device 300 is attributable to the notice given by the second management device 120, and determines whether the new fragment extracted from the registered information on the first management device 110 matches the new fragment received from the second management device 120 (2-8).

In the event that the first management device 110 determines that the operation of updating the registered information as accepted from the terminal device 300 is not attributable to the notice given by the second management device 120, or determines that the old fragment and new fragment extracted from the registered information do not match the old fragment and new fragment received from the second management device 120, the first management device 110 gives the second management device 120 a notice of the identifier of the user whose registered information has been updated and of the old fragment and new fragment extracted from the registered information (2-9).

Note that the first management device 110 and the second management device 120 are interchangeable. Thus, after issuing a warning to the terminal device 300 (1-5), the second management device 120 may accept an operation of updating the registered information, and may perform processes similar to (2-7) to (2-9) above, on the basis of the accepted information to be registered.

2. General Configuration of Information Processing Device

The following describes a general configuration of a typical information processing device 600 implementing the first management device 110 and the second management device 120, which are included in the management system 100 according to an embodiment of the present disclosure.

Figure 3:
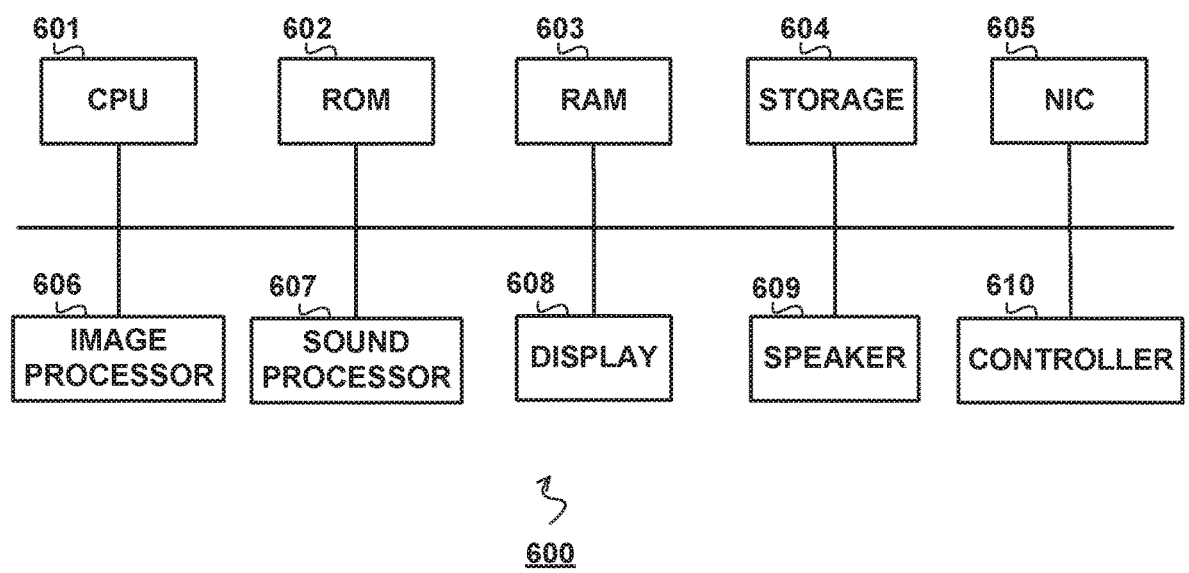
FIG. 3 is a diagram illustrating a general configuration of a typical information processing device implementing the first management device and the second management device, which are included in the management system according to an embodiment of the present disclosure.

As illustrated in FIG. 3, the information processing device 600 includes a central processing unit (CPU) 601, a read only memory (ROM) 602, a RAM 603, a storage 604, a network interface card (NIC) 605, an image processor 606, a sound processor 607, a display 608, a speaker 609, and a controller 610.

The CPU 601 is connected to the individual components to exchange control signals and data therewith and controls operations throughout the information processing device 600.

The ROM 602 records programs on an operating system needed for controlling operations throughout the information processing device 600, as well as recording various types of data.

The RAM 603, which is used for temporarily storing data and programs, holds programs and data read out from the storage 604, data for communications, and so on.

The storage 604, which is formed of, for example, a hard disk or a flash memory, stores data processed in the information processing device 600. The storage 604 may include a device or the like that reads data from a non-transitory computer-readable information recording medium such as a compact disc (CD).

The NIC 605, which is used for connecting the information processing device 600 to a computer communication network such as the Internet, allows the information processing device 600 to communicate with another information processing device and others vie the NIC 605.

The image processor 606 causes an image arithmetic processor, which is included in the CPU 601 or in the image processor 606, to process data read out from the storage or some other device and records the resulting data into a frame memory included in the image processor 606. The image information recorded in the frame memory is converted at a certain synchronizing timing into video signals to be output to the display 608.

The sound processor 607 converts data read out from the storage or some other device into analog sound signals to be output from the speaker 609.

The controller 610 accepts input of instructions given by a user.

Referring to FIGS. 1 to 8, the following describes the management system 100, which includes the first management device 110 and the second management device 120 as implemented by the above-described information processing device 600. When one information processing device 600 is powered on, a program causing the device to function as the first management device 110 is executed, and when another information processing device 600 is powered on, a program causing the device to function as the second management device 120 is executed, whereby the management system 100 according to an embodiment is implemented.

3. General Configuration of Management System According to Embodiment

A management system herein is a system that includes a plurality of management devices. Each of the plurality of the management devices included in the management system has a single identifier to be used by a user.

In the present embodiment, it is assumed that the management system 100 includes two management devices that are managed by different companies. It is also assumed that the companies managing their respective management devices are in a relationship of members of the same group.

Figure 4:
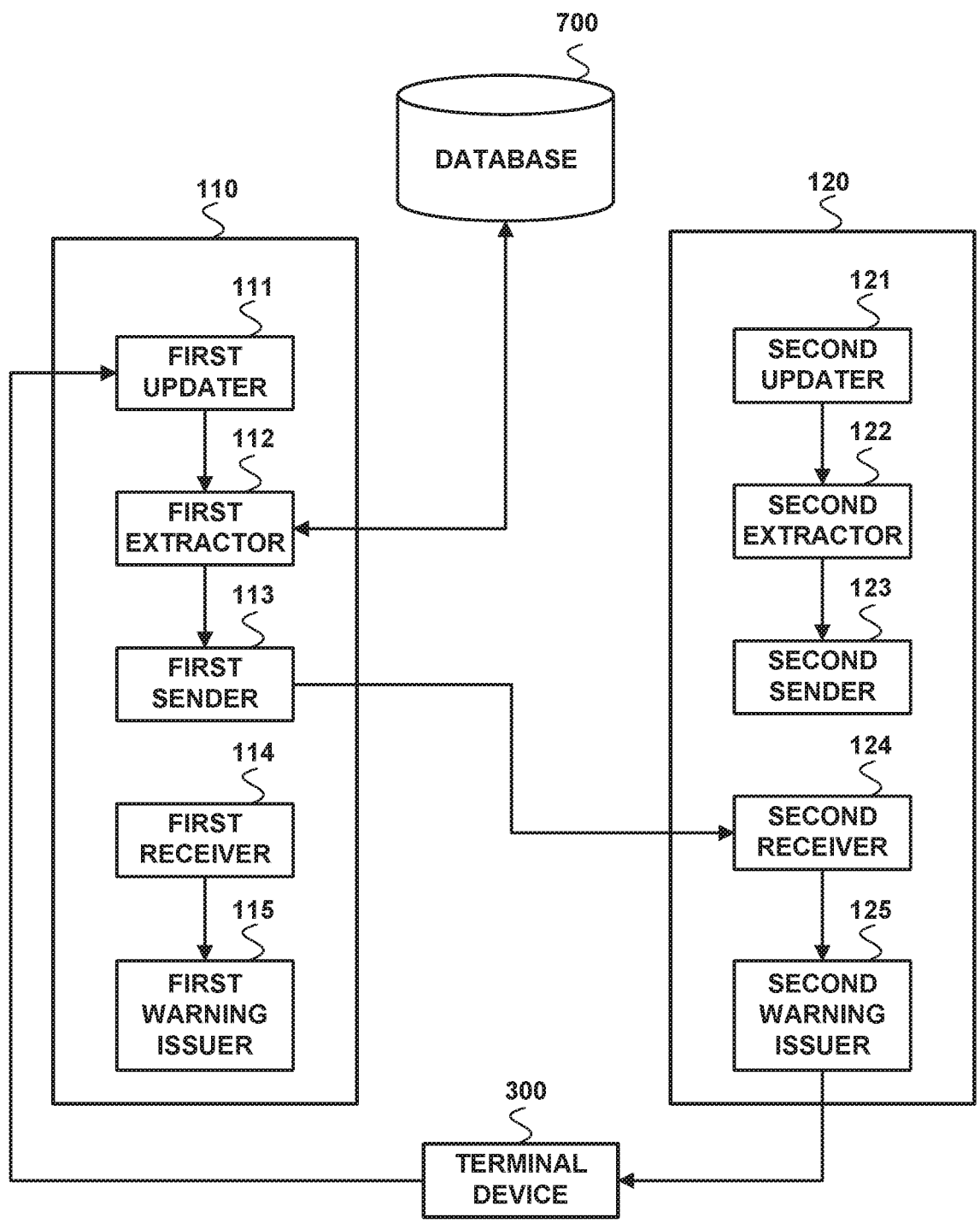
FIG. 4 is a diagram illustrating a general configuration of the management system according to an embodiment.
Figure 8:
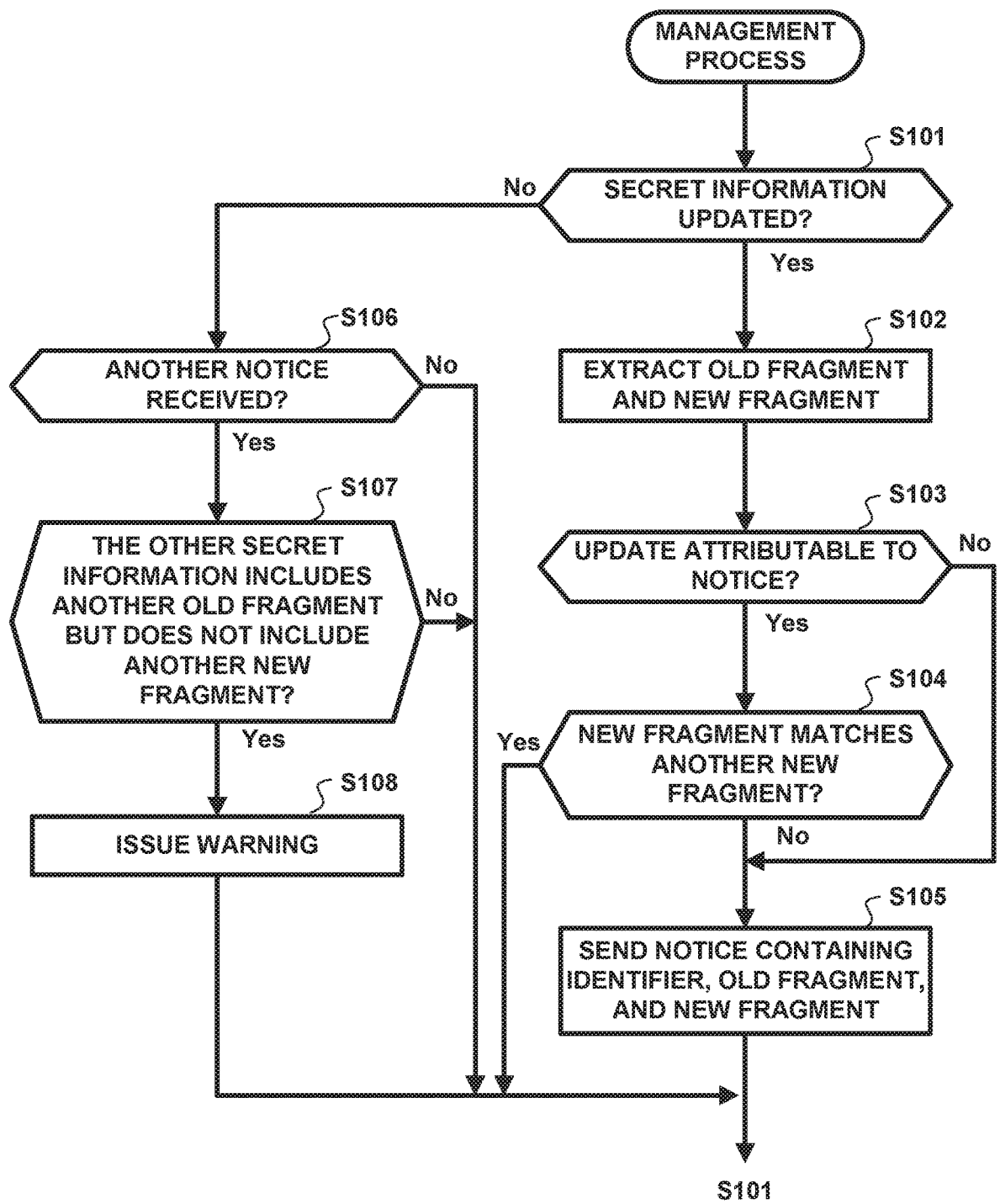
FIG. 8 is a flowchart intended to explain a management process performed by the management device according to an embodiment.

The management system 100 includes the first management device 110 and the second management device 120 as illustrated in FIG. 4.

The first management device 110 includes a first updater 111, a first extractor 112, a first sender 113, a first receiver 114, and a first warning issuer 115. The second management device 120 includes a second updater 121, a second extractor 122, a second sender 123, a second receiver 124, and a second warning issuer 125. The individual components of the first management device 110 have functions similar to the respective components of the second management device 120.

In the present embodiment, the CPU 601 in the first management device 110 functions as the first updater 111, and the CPU 601 and the NIC 605 in the first management device 110 collaborate to function as the first extractor 112, the first sender 113, the first receiver 114, and the first warning issuer 115. Likewise, the CPU 601 in the second management device 120 functions as the second updater 121, and the CPU 601 and the NIC 605 in the second management device 120 collaborate to function as the second extractor 122, the second sender 123, the second receiver 124, and the second warning issuer 125.

The first management device 110 manages a first identifier and first secret information in such a way that they are associated with each other. The second management device 120 manages the first identifier and second secret information in such a way that they are associated with each other.

An identifier is identification information for identifying a user, such as a mail address, a user name, or a user number.

The first identifier is, for example, a mail address "xxx@xxx.com".

Secret information is user information that is managed in confidence in association with the identifier by the management device, and is not allowed to be publicly available without permission of the user or the administrator. The secret information may be, for example, personal information such as the user's home address, full name, birth date, and phone number.

The first secret information is managed in the first management device 110 in association with the first identifier. The second secret information is managed in the second management device 120 in association with the first identifier. In other words, the first secret information and the second secret information are associated with the same identifier in common but separately managed in different devices.

As an example, it is assumed here that the first secret information is registered to a secret information table (first management device) 400a stored in the first management device 110, and that the second secret information is registered to a secret information table (second management device) 400b stored in the second management device 120. In the following example, the first secret information and the second secret information each represent a home address. Note that each secret information table may be stored in a device external to the management device, but reference cannot be made from the secret information table (first management device) 400a associated with the first management device 110 to the secret information table (second management device) 400b associated with the second management device 120.

As illustrated in FIG. 5, the identifier 400a1, the prior-to update secret information 400a2, and the subsequent-to-update secret information 400a3 associated with one another are registered to the secret information table (first management device) 400a.

For example, the first line in the secret information table (first management device) 400a in FIG. 5 shows that the prior-to update secret information 400a2 associated with the identifier 400a1 "xxx@xxx.com" is "東京都品川区東品川 9-8-7" and the subsequent-to-update secret information 400a3 is "東京都世田 谷区玉川西 6-5-4".

As illustrated in FIG. 6, the identifier 400b1, the prior-to update secret information 400b2, and the subsequent-to-update secret information 400b3 associated with one another are registered to the secret information table (second management device) 400b.

For example, the first line in the secret information table (second management device) 400b in FIG. 6 shows that the prior-to update secret information 400b2 associated with the identifier 400b1 "xxx@xxx.com" is "東京都品川区東品川 9-8-7" and the subsequent-to-update secret information 400b3 is absent. In other words, in the second management device 120, the secret information associated with the identifier "xxx@xxx.com" has not been updated since the initial registration, indicating that the latest secret information is "東京都品川 区東品川 9-8-7".

The first updater 111 updates the first secret information.

As an example, suppose that the prior-to update secret information 400a2 "東京都品川 区東品川 9-8-7" is associated with the identifier 400a1 "xxx@xxx.com" and is registered to the table, and that, in the state where this information is not updated yet, the first management device 110 has accepted an operation of updating the first secret information into "東京都世田 谷区玉川西 6-5-4" from the user using the identifier "xxx@xxx.com". Then, the first updater 111 registers "東京都世田 谷区玉川西 6-5-4" as the subsequent-to-update secret information 400a3 to the secret information table (first management device) 400a.

The first extractor 112 extracts a first old fragment and a first new fragment, where the first old fragment is included in the first secret information prior to the update but not included in the first secret information subsequent to the update, and the first new fragment is not included in the first secret information prior to the update but is included in the first secret information subsequent to the update.

The fragment as used herein is defined as a component of secret information, the component having distinctiveness to some extent but being insufficient for identifying the contents of the secret information.

Taking a home address as an example of the secret information, names of country, state, capital, prefecture, and city, numbers, symbols, single alphabetical characters, and character strings used in a home address (such as "区", "丁", "目", "番", "地", "号", "St", and "Av") are excluded from fragments because each of these components is regarded as lacking distinctiveness by itself. Note that the user of the first management device 110 can specify at the user's discretion a level of an administrative district to be included in a fragment, on the basis of contents of secret information. For example, for the secret information "東京都品川 区東品川 9-8-7", fragments may not be extracted from "品川", which represents an administrative district belonging to the level "区"; on the other hand, for the secret information "

福岡県福岡市 中央区 6-7-8", a fragment may be extracted from "中央", which represents an administrative district belonging to the level "区".

In the case of the Japanese language, a fragment may be a single character. In the case of languages using alphabets, fragments can be created in units of two consecutive characters. For example, fragments in "100 S Penton St STE 100 Alexandria, Va. 12345 U.S.A." are "pe", "ey", "yt", "to", "on", "al", "le", "ex", "xa", "an", "nd", "dr", "ri", and "ia".

The first old fragment is a fragment that is included in the first secret information prior to an update but not included in the first secret information subsequent to the update. The first new fragment is a fragment that is not included in the first secret information prior to an update but is included in the first secret information subsequent to the update.

For example, assuming that the first secret information prior to an update is "東京都品川 区東品川 9-8-7" and the first secret information subsequent to the update is "東京都世田谷区玉川西 6-5-4", candidates for the first old fragment are "東" and "品" and candidates for the first new fragment are "玉" and "西".

For example, the first extractor 112 selects one fragment placed earlier in the secret information from each group of candidates to set the first old fragment to "東" and the first new fragment to "玉".

The first sender 113 sends a first notice that specifies the first identifier, the first old fragment, and the first new fragment to the second management device 120.

The first notice is a notice sent from the first management device 110 to the second management device 120.

For example, the first sender 113 sends the first notice that specifies "xxx@xxx.com", "東", and "玉" to the second management device 120.

The second receiver 124 receives the first notice from the first management device 110.

For example, the second receiver 124 receives the first notice specifying "xxx@xxx.com", "東", and "玉".

If the second secret information includes the first old fragment specified in the first notice but does not include the first new fragment specified therein, the second warning issuer 125 warns the user using the first identifier to correct the second secret information.

For example, the second warning issuer 125 references the secret information table (second management device) 400b in FIG. 6 to identify the latest second secret information associated with the identifier "xxx@xxx.com" as specified in the first notice. The secret information table (second management device) 400b does not contain any subsequent-to-update information in the second secret information associated with the identifier "xxx@xxx.com", and thus the prior-to update information "東京都品川 区東品川 9-8-7" represents the latest second secret information. The second warning issuer 125 determines whether this second secret information satisfies the condition that the first old fragment "東" is included and the condition that first new fragment "玉" is not included. In this example, the second warning issuer 125 determines that the first old fragment "東" is included but the first new fragment "玉" is not included in the second secret information, and thus sends the user using "xxx@xxx.com" a message requesting the user to correct the secret information on the second management device 120. Alternatively, the message may be presented on a login screen that appears when the user using "xxx@xxx.com" logs in to a service whose login status can be recognized by the second management device 120.

On the other hand, if the first old fragment is not included but the first new fragment is included in the second secret information, the second warning issuer 125 deems it highly probable that the second secret information matches the post-update first secret information, and thus gives no warning to the user using the first identifier.

For example, assuming that the latest second secret information associated with the identifier "xxx@xxx.com" on the second management device 120 is "東京都世 田谷区玉川西 6-5-4", the second secret information does not include the first old fragment "東" as specified in the first notice but includes the first new fragment "玉", and thus no warning is given to the user using the identifier "xxx@xxx.com".

In the event that the second secret information includes neither the first old fragment nor the first new fragment, or that the second secret information includes both the first old fragment and the first new fragment, the second warning issuer 125 may determine that the first secret information corresponding to the first identifier on the first management device does not match the second secret information corresponding to the first identifier on the second management device 120, and may give notice of such discrepancy to the user of the first identifier or to the first management device 110.

For example, assuming that the latest second secret information (prior-to update secret information 400b2) is registered as "東京都世田 谷区多摩川西 6-5-4", which is incorrect information, the second secret information includes neither the first old fragment "東" nor the first new fragment "玉", and thus the second warning issuer 125 gives notice of the discrepancy. As another example, assuming that the latest second secret information is registered as "東京都世田谷区玉川東品川 6-5-4", which is incorrect information, the second secret information includes both the first old fragment "東" and the first new fragment "玉", and thus the second warning issuer 125 gives notice of the discrepancy.

The second warning issuer 125 may give a warning to the user using the first identifier by presenting the first old fragment and the first new fragment to the user.

For example, as illustrated in FIG. 7, a warning page 500 contains the first old fragment "東" and the first new fragment "玉", and hints about the contents of an update made on another management device may be sent to the address "xxx@xxx.com".

The present embodiment makes it possible to accurately detect that secret information associated with an identifier has been updated on one management device but secret information associated with the same identifier on another management device has not been updated, without transmitting the secret information itself since secret information itself is not transmitted to any other management device, the secret information can be protected.

In addition, if the second secret information on the second management device 120 does not include the pre-update fragment of the first secret information but includes the post-update fragment of thereof, no warning is issued because it is determined that the latest second secret information is highly likely to match the post-update first secret information. Therefore, data traffic can be reduced as compared with the cases where a notice is given every time an update is detected.

Furthermore, as fragments of the pre-update and post-update secret information are presented to the user, the user can understand which secret information and how the secret information should be corrected.

The first extractor 112 may search a predetermined database for fragments that are included in the first secret information prior to an update but are not included in the first secret information subsequent to the update, and then identify a fragment having at least a predetermined number of search results as the first old fragment. Likewise, the first extractor 112 may search the predetermined database for fragments that are not included in the first secret information prior to an update but are included in the first secret information subsequent to the update, and then identify a fragment having at least the predetermined number of search results as the first new fragment.

The database stores various information written in characters and may be, for example, a database included in the first management device 110 or an external database (a database 700, for example) that can be searched via the Internet or the like.

The predetermined number, which can be set by the user of the first management device 110 as appropriate, is a minimum number needed for a fragment to be regarded as very common.

For example, the first extractor 112 searches the predetermined database for the fragments "東" and "品", which are included in the first secret information prior to an update but not included in the first secret information subsequent to the update, and then identifies a fragment having at least a predetermined number (one million, for example) of search results as the first old fragment. Likewise, the first extractor 112 searches the predetermined database for the fragments "玉" and "酉", which are not included in the first secret information prior to the update but included in the first secret information subsequent to the update, and then identifies a fragment having at least the predetermined number of search results as the first new fragment.

When two or more fragments have at least the predetermined number of search results, the fragment having the highest number of search results may be identified as the first old fragment or the first new fragment.

When no fragment having at least a predetermined number of search results is found and there is no candidate for the first old fragment or the first new fragment, the first sender 113 may refrain from giving the first notice to the second management device 120. When a fragment having at least the predetermined number of search results is found as the first old fragment only, the first sender 113 may send the first notice specifying the first identifier and the first old fragment to the second management device 120, and the second warning issuer 125 may give a warning to the user if the second secret information includes the first old fragment, but may refrain from giving a warning to the user if the second secret information does not include the first old fragment. Likewise, when a fragment having at least the predetermined number of search results is found as the first new fragment only, the first sender 113 may send the first notice specifying the first identifier and the first new fragment to the second management device 120, and the second warning issuer 125 may refrain from giving a warning to the user if the second secret information includes the first new fragment, but may give a warning to the user if the second secret information does not include the first new fragment.

Such configuration ensures that the first management device notifies the second management device of the first old fragment and the first new fragment that contain very common information, making it difficult to identify specific contents of the secret information even though a fragment of the secret information is sent to another management device.

The first extractor 112 may extract a plurality of first old fragments and a plurality of first new fragments from the first secret information. In this case, the first sender 113 sends a first notice that specifies the first identifier, a plurality of the first old fragments, and a plurality of the first new fragments to the second management device 120. If the second secret information includes any of the plurality of the first old fragments and does not include all of the plurality of the first new fragments, the second warning issuer 125 warns the user using the first identifier to correct the second secret information.

For example, the first extractor 112 extracts the fragments "東" and "品" from the first secret information prior to an update as the first old fragments, and extracts the fragments "玉" and "酉" from the first secret information subsequent to the update as the first new fragments. The first sender 113 sends a first notice that specifies the first identifier along with these first old fragments and these first new fragments to the second management device 120. Then, the second warning issuer 125 references the secret information table (second management device) 400b to determine whether the latest second secret information "東京都品川1区東品川 9-8-7" satisfies the condition that any of "東" and "品" is included and the condition that all of "玉" and "酉" are included.

When the second secret information includes none of the plurality of the first old fragments and includes all of the plurality of the first new fragments, the second warning issuer 125 gives no warning.

Such configuration ensures that a management device, when notified of a change made to secret information from another management device, can determine with high precision whether the locally managed secret information matches the secret information managed on the other management device, without receiving the secret information itself from the other management device.

Even when the second secret information includes none of the plurality of the first old fragments, if the second secret information does not include all of the plurality of the first new fragments, the second warning issuer 125 may warn the user using the first identifier to correct the second secret information, as the second secret information is regarded as different from the first secret information subsequent to the update.

The first sender 113 sends the first notice in which the plurality of the first old fragments is arranged in random order and the plurality of the first new fragments is arranged in random order to the second management device 120.

For example, the first sender 113 sends the first notice in which the first old fragments are arranged as "東" "品" and the first new fragments are arranged as "酉" "玉".

Assuming that fragments are arranged in the same order as in the secret information from which the fragments are extracted, contents of the secret information may be easily guessed. In contrast, the aforementioned arrangement makes it difficult for people other than the user who knows the correct secret information to guess the contents of the secret information.

It is now further assumed that the first management device 110 manages third secret information in association with a second identifier, and the second management device 120 further manages fourth secret information in association with the second identifier.

For example, the first management device 110 and the second management device 120 each manage secret information associated with the second identifier "yyy@yyy.com".

The second management device 120 further includes: a second updater 121 that updates the fourth secret information; a second extractor 122 that extracts a second old fragment and a second new fragment, where the second old fragment is included in the fourth secret information prior to an update but not included in the fourth secret information subsequent to the update, and the second new fragment is not included in the fourth secret information prior to the update but is included in the fourth secret information subsequent to the update; and a second sender 123 that sends a second notice that specifies the second identifier, the second new fragment, and the second old fragment to the first management device 110.

As an example, suppose that prior-to update secret information 400b2 "千葉 県柏市明原 10-11-12" is associated with the identifier 400b1 "yyy@yyy.com" and is registered to the table, and that, in the state where this information is not updated yet, the second management device 120 has accepted an operation of updating the fourth secret information into " 福岡県福岡 市中央区 6-7-8" from the user using the identifier "yyy@yyy.com". Then, the second updater 121 registers " 福岡県福岡 市中央区 6-7-8" as the subsequent-to-update secret information 400b3 to the secret information table (second management device) 400b.

Then, the second extractor 122 extracts a plurality of fragments "明" and "原" as the second old fragments and extracts a plurality of fragments "中" and "央" as the second new fragments, and the second sender 123 sends the second notice that specifies "yyy@yyy.com", "明" "原", and "中" "央" to the first management device 110.

The first management device 110 further includes: a first receiver 114 that receives the second notice from the second management device 120; and a first warning issuer 115 that warns the user using the second identifier to correct the third secret information when the third secret information includes the second old fragments specified in the second notice but does not include the second new fragments specified in the second notice.

For example, the first receiver 114 receives the second notice that specifies the second identifier "yyy@yyy.com", the second old fragments "明" "原", and the second new fragments "中" "央". Then, the first warning issuer 115 references the secret information table (first management device) 400a in FIG. 5 to determine that the latest secret information "千葉県柏市明原 10-11-12" as associated with "yyy@yyy.com" includes the second old fragments "明" and "原" but does not include the second new fragments "中" and "央", and then sends the user using "yyy@yyy.com" a message requesting the user to correct the secret information on the first management device 110.

Next, the first updater 111 updates the third secret information, and the first extractor 112 further extracts a third old fragment and a third new fragment, where the third old fragment is included in the third secret information prior to the update but not included in the third secret information subsequent to the update, and the third new fragment is not included in the third secret information prior to the update but is included in the third secret information subsequent to the update.

For example, when an operation of correcting the third secret information "千葉県柏市明原 10-11-12" into " 福岡県福岡 市中央区 6-7-8" is accepted from the user using "yyy@yyy.com", the first updater 111 registers " 福岡県福岡 市中央区 6-7-8" as the subsequent-to-update secret information 400a3 to the secret information table (first management device) 400a in FIG. 5. Then, the first extractor 112 extracts "明" and "原" as the third old fragments and "中" and "央" as the third new fragments.

The first sender 113 further sends a third notice that specifies the second identifier, the third old fragments, and the third new fragments to the second management device 120. However, the first sender 113 refrains from sending the third notice to the second management device 120 if the update of the third secret information by the first updater 111 on the first management device 110 is attributable to the second notice and the third new fragment matches the second new fragment.

The phrase "update of the third secret information attributable to the second notice" above means that the First warning issuer 115 gives a warning on the basis of the received second notice and the third secret information is updated in accordance with the warning asking for correction. In other words, any update of secret information that is not requested to be updated in the warning is not applicable to "update of the third secret information attributable to the second notice". For example, suppose that the first management device 110 and the second management device 120 included in the management system 100 each manage secret information that includes home address and other items. Then, if the phone number of the user of "yyy@yyy.com" has been updated although a warning asking for updating the home address of the user of "yyy@yyy.com" was given, such update of the phone number is not regarded as an update attributable to the second notice. Likewise, if some secret information regarding another user has been updated despite the warning asking for correcting the secret information regarding the user of "yyy@yyy.com", such update is not regarded as an update attributable to the second notice.

For example, suppose that a warning asking for correction of the third secret information was given to the user using "yyy@yyy.com", and then an operation of correcting the third information "千葉県柏市明原 10-11-12" into "福岡県福岡市中央 区 6-7-8" has been accepted. In this case, the first sender 113 determines that the update of the third secret information performed by the first updater 111 is attributable to the second notice. Then, since the second new fragments "中" and "央" as specified in the second notice match the third new fragments "中" and "央", the first sender 113 refrains from sending the third notice that specifies the second identifier "yyy@yyy.com", the third old fragments "明" and "原", and the third new fragments "中" and "央" to the second management device 120.

In an embodiment in which a notice that secret information has been updated is merely given to another management device, the notice is sent to the other management device that may have already updated the secret information. In contrast, the foregoing configuration prevents unnecessary notices from being sent, thus reducing data traffic.

On the other hand, if any update of the third secret information performed by the first updater 111 is not attributable to the second notice, or if the third new fragment does not match the second new fragment, the first sender 113 sends the third notice to the second management device 120.

As an example, suppose that an item other than home address of secret information regarding the user using "yyy@yyy.com" has been updated. In this case, since the updated secret information is different from the secret information updated on the second management device 120, the first sender 113 sends the third notice that specifies fragments extracted from such different secret information prior to and subsequent to the update to the second management device 120.

As another example, suppose that the second new fragments extracted from the fourth secret information subsequent to an update do not match the third new fragments extracted from the third secret information subsequent to an update. In this case, either the third or fourth secret information may probably be updated with incorrect contents, and thus the third notice is sent to the second management device 120.

Sikh configuration ensures that, in the event that the post-update information is inconsistent between management devices, the user of the management device and the user of the terminal device can be notified that the secret information is inconsistent.

4. Operations of Management Device According to Embodiment

The following describes operations performed by a management device included in the management system of the present embodiment. The management device starts the management process illustrated in FIG. 8 when powered on, for example.

Note that the first management device 110 and the second management device 120 are hereinafter collectively called the management device 800. Likewise, the first updater 111 and the second updater 121 are called the updater 801, the first extractor 112 and the second extractor 122 are called the extractor 802, the first sender 113 and the second sender 123 are called the sender 803, the first receiver 114 and the second receiver 124 are called the receiver 804, and the first warning issuer 115 and the second warning issuer 125 are called the warning issuer 805.

The updater 801 determines whether the secret information that is managed in association with an identifier has been updated (step S101). When the updater 801 determines that the secret information has been updated (Yes in step S101), the extractor 802 extracts an old fragment and anew fragment, the old fragment being included in the secret information prior to the update but not included in the secret information subsequent to the update, the new fragment being not included in the secret information prior to the update but included in the secret information subsequent to the update (step S102). On the other hand, when the updater 801 determines that the secret information has not been updated (No in step S101), the receiver 804 determines whether another notice that specifies another identifier, another old fragment, and another new fragment has been received from another management device 800 (step S106).

For example, when the updater 801 accepts from the user using the identifier "xxx@xxx.com" an operation of updating the secret information "東京都品川 区東品川 9-8-7", which is registered to the management device 800, into "東京都世田谷区玉川西 6-5-4", the updater 801 updates the secret information in accordance with the given information. Then, the extractor 802 extracts "東" and "品" as the old fragments and "玉" and "西" as the new fragments. If the updater 801 has not accepted any updating operation, the receiver 804 determines whether another notice has been received from another device.

The sender 803 determines whether the update performed by the updater 801 is attributable to another notice (step S103). When the sender 803 determines that the update is attributable to another notice (Yes in step S103), the sender 803 then determines whether the new fragments extracted by the extractor 802 match other new fragments specified in the other notice (step S104). When the sender 803 determines that the new fragments match the other new fragments (Yes in step S104), the processing returns to step S101. On the other hand, when the sender 803 determines that the update is not attributable to another notice (No in step S103), or when the sender 803 determines that the new fragments do not match the other new fragments step S104), the sender 803 sends a notice that specifies the identifier associated with the updated secret information, an old fragment, and anew fragment to the other management device (step S105).

For example, in the case where a notice that specifies the identifier "xxx@xxx.com", the old fragments "東" and "品", and the new fragments "玉" and "西" was received from the other management device 800, and a warning was issued to the user of "xxx@xxx.com" in response to the notice, when an operation of updating "東京 都品川区東品川 9-8-7" into "東京都世田 谷区玉川西 6-5-4" is accepted from "xxx@xxx.com", the sender 803 refrains from sending a notice to the other management device 800. On the other hand, if no notice has been received from the other management device 800, or if the new fragments extracted by the extractor 802 do not match the new fragments specified in the notice, the sender 803 sends a notice that specifies the identifier "xxx@xxx.com", the old fragments "東" and "品", and the new fragments "玉" and "西" to the other management device 800.

When the receiver 804 determines in step S106 that another notice has been received from another management device 800 (Yes in step S106), the warning issuer 805 determines whether the other secret information managed in association with another identifier satisfies the condition that other old fragments are included but other new fragments are not included in the other secret information (step S107). When the warning issuer 805 determines that the aforementioned condition is satisfied (Yes in step S107), the warning issuer 805 warns the user using the other identifier to correct the other secret information (step S108). On the other hand, when the receiver 804 determines that no other notice has been received step S106), or when the warning issuer 805 determines that the aforementioned condition is not satisfied (No in step S107), the processing returns to step S101.

For example, supposing that the receiver 804 has received another notice that specifies another identifier "yyy@yyy.com", other old fragments "明" and "原", and other new fragments "中" and "央", the warning issuer 805 determines whether the secret information managed in association with "yyy@yyy.com" in the management device 800 includes the old fragments "明" and "原" but does not include the new fragments "中" and "央". When the warning issuer 805 determines that such other old fragments are included but such other new fragments are not included in the secret information, the warning issuer 805 warns the user using "yyy@yyy.com" to correct the secret information managed in the management device 800. On the other hand, if no other notice has been received, or if such other new fragments are included in the secret information managed in association with "yyy@yyy.com", the processing returns to step S101.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along of equivalents to which such claims are entitled.

REFERENCE SIGNS LIST

100 Management system
110 First management device
120 Second management device
111 First updater 112 First extractor
113 First sender
114 First receiver
115 First warning issuer
121 Second updater
122 Second extractor
123 Second sender
124 Second receiver
125 Second warning issuer
200 Internet
300, 301, 302-30n Terminal device
500 Warning page
600 Information processing device
601 CPU
602 ROM
603 RAM
604 Storage
605 NIC
606 Image processor
607 Sound processor
608 Display
609 Speaker
610 Controller
700 Database
800 Management device
801 Updater
802 Extractor
803 Sender
804 Receiver
805 Warning issuer

The invention claimed is:

1. A management system comprising a first management device and a second management device, the first management device managing a first identifier and first secret information associated with each other, the second management device managing the first identifier and second secret information associated with each other,
   wherein the first management device comprises:
      a first updater that updates the first secret information;
      a first extractor that extracts a first old fragment and a first new fragment, the first old fragment being included in the first secret information prior to an update but not included in the first secret information subsequent to the update, the first new fragment being not included in the first secret information prior to the update but included in the first secret information subsequent to the update; and
      a first sender that sends a first notice that specifies the first identifier, the first old fragment, and the first new fragment to the second management device, and
   wherein the second management device comprises:
      a second receiver that receives the first notice from the first management device; and
      a second warning issuer that warns a user using the first identifier to correct the second secret information when the second secret information includes the first old fragment specified in the first notice but does not include the first new fragment specified in the first notice.

2. The management system according to claim 1,
   wherein the first extractor searches a predetermined database for fragments that are included in the first secret information prior to the update but are not included in the first secret information subsequent to the update, and identifies a fragment having at least a predetermined number of search results as the first old fragment, and the first extractor searches the predetermined database for fragments that are not included in the first secret information prior to the update but are included in the first secret information subsequent to the update, and identifies a fragment having at least the predetermined number of search results as the first new fragment.

3. The management system according to claim 1,
   wherein the first extractor extracts a plurality of the first old fragments and a plurality of the first new fragments from the first secret information,
   wherein the first sender sends the first notice that specifies the first identifier, the plurality of the first old fragments, and the plurality of the first new fragments to the second management device, and
   wherein, if the second secret information includes any of the plurality of the first old fragments and does not include all of the plurality of the first new fragments, the second warning issuer warns the user using the first identifier to correct the second secret information.

4. The management system according to claim 3,
   wherein the first sender sends the first notice in which the plurality of the first old fragments is arranged in random order and the plurality of the first new fragments is arranged in random order to the second management device.

5. The management system according to claim 1,
   wherein the first management device manages third secret information in association with a second identifier,
   wherein the second management device manages fourth secret information in association with the second identifier,
   wherein the second management device further comprises:
      a second updater that updates the fourth secret information;
      a second extractor that extracts a second old fragment and a second new fragment, the second old fragment being included in the fourth secret information prior to an update but not included in the fourth secret information subsequent to the update, the second new fragment being not included in the fourth secret information prior to the update but included in the fourth secret information subsequent to the update; and
      a second sender that sends a second notice that specifies the second identifier, the second new fragment, and the second old fragment to the first management device,
   wherein the first management device further comprises:
      a first receiver that receives the second notice from the second management device; and
      a first warning issuer that warns a user using the second identifier to correct the third secret information when the third secret information includes the second old fragment specified in the second notice but does not include the second new fragment specified in the second notice,
   wherein the first updater further updates the third secret information,
   wherein the first extractor further extracts a third old fragment and a third new fragment, the third old fragment being included in the third secret information prior to an update but not included in the third secret information subsequent to the update, the third new fragment being not included in the third secret information prior to the update but included in the third secret information subsequent to the update, wherein the first sender further sends a third notice that specifies the second identifier, the third old fragment, and the third new fragment to the second management device, and wherein, in the first management device,
the first sender refrains from sending the third notice to the second management device if the update of the third secret information performed by the first updater is attributable to the second notice and the second new fragment matches the third new fragment.

6. The management system according to claim 1,
wherein the second warning issuer gives a warning by presenting the first old fragment and the first new fragment to the user using the first identifier.

7. A management device that manages an identifier and secret information associated with each other, the management device comprising:
an updater that updates the secret information;
an extractor that extracts an old fragment and a new fragment, the old fragment being included in the secret information prior to an update but not included in the secret information subsequent to the update, the new fragment being not included in the secret information prior to the update but included in the secret information subsequent to the update;
a sender that sends a notice that specifies the identifier, the old fragment, and the new fragment to another management device;
a receiver that receives another notice from the another management device; and
a warning issuer that warns, when other secret information managed in association with another identifier specified in the another notice includes another old fragment specified in the another notice but does not include another new fragment specified in the another notice, a user using the another identifier to correct the other secret information.

8. A management method executed by a management system that comprises a first management device and a second management device, the first management device managing a first identifier and first secret information associated with each other, the second management device managing the first identifier and second secret information associated with each other, the management method comprising:
a first updating step of updating the first secret information, the first updating step being performed by the first management device;
a first extracting step of extracting a first old fragment and a first new fragment, the first old fragment being included in the first secret information prior to an update but not included in the first secret information subsequent to the update, the first new fragment being not included in the first secret information prior to the update but included in the first secret information subsequent to the update, the first extracting step being performed by the first management device;
a first sending step of sending a first notice that specifies the first identifier, the first old fragment, and the first new fragment to the second management device, the first sending step being performed by the first management device;
a second receiving step of receiving the first notice from the first management device, the second receiving step being performed by the second management device; and
a second warning step of warning a user using the first identifier to correct the second secret information when the second secret information includes the first old fragment specified in the first notice but does not include the first new fragment specified in the first notice, the second warning step being performed by the second management device.

9. A non-transitory computer-readable information recording medium that records a program causing a computer to function as a management device that manages an identifier and secret information associated with each other, the program causing the computer to function as:
an updater that updates the secret information;
an extractor that extracts an old fragment and a new fragment, the old fragment being included in the secret information prior to an update but not included in the secret information subsequent to the update, the new fragment being not included in the secret information prior to the update but included in the secret information subsequent to the update;
a sender that sends a notice that specifies the identifier, the old fragment, and the new fragment to another management device;
a receiver that receives another notice from the another management device; and
a warning issuer that warns, when other secret information managed in association with another identifier specified in the another notice includes another old fragment specified in the another notice but does not include another new fragment specified in the another notice, a user using the another identifier to correct the other secret information.

* * * * *